though the rubber stop or bumper 58 and a spiral

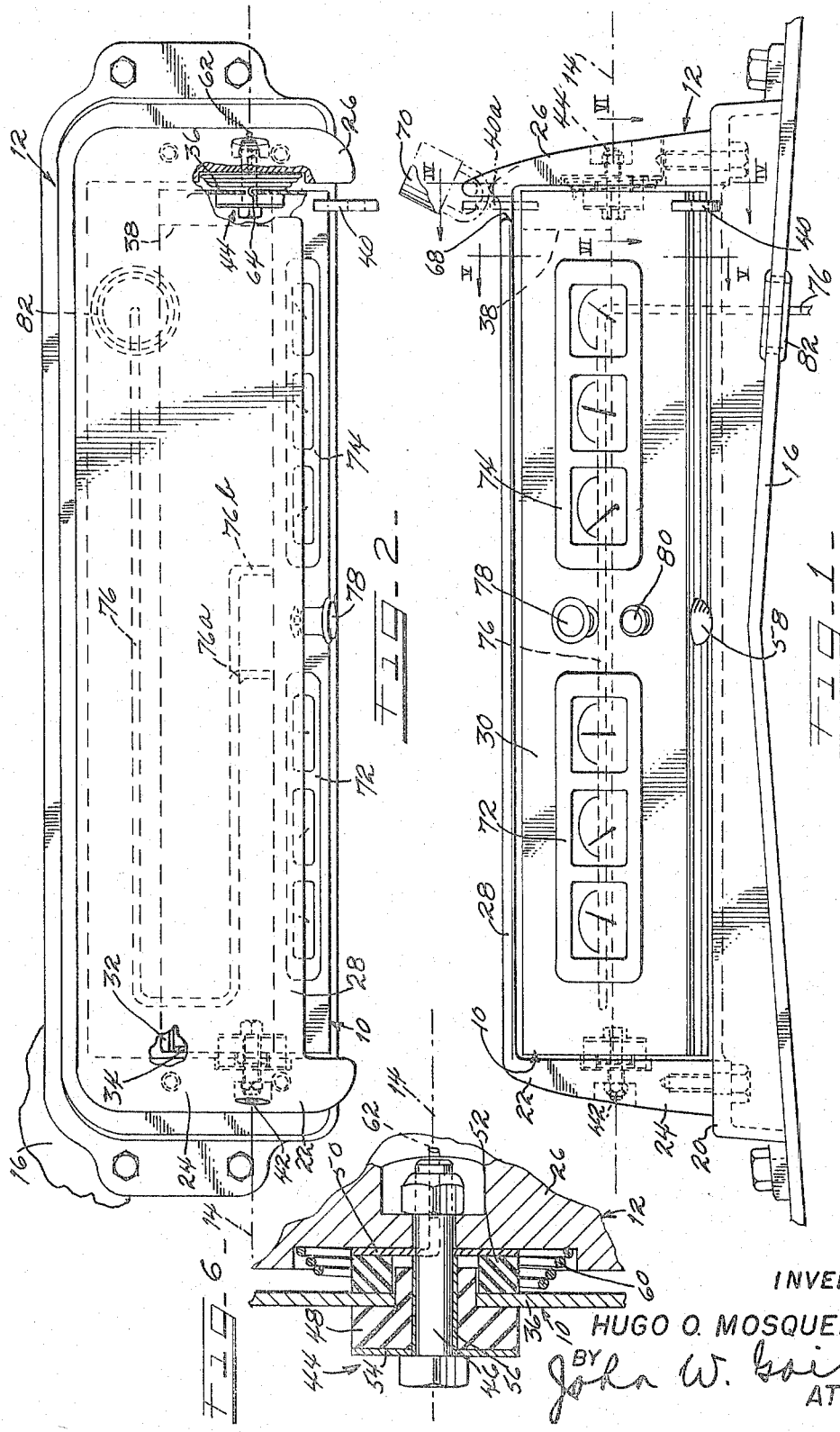

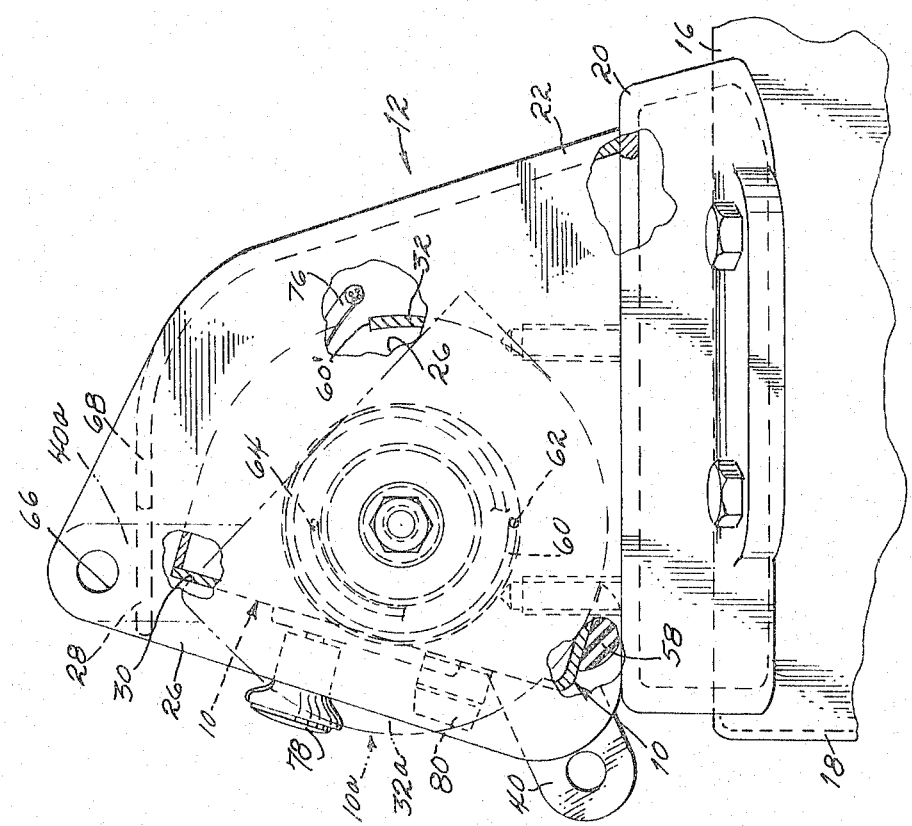
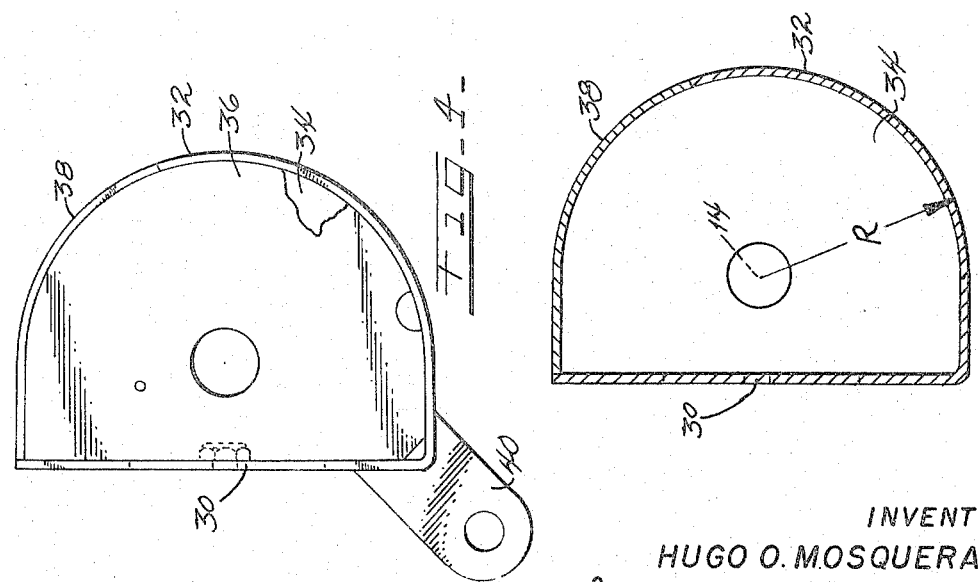

United States Patent Office 3,302,743
Patented Feb. 7, 1967

3,302,743
LOCKABLE INSTRUMENT PANEL
Hugo O. Mosquera, Wheaton, Ill., assignor to International Harvester Company, Chicago, Ill., a corporation of Delaware
Filed June 7, 1965, Ser. No. 461,865
13 Claims. (Cl. 180—90)

This application relates to an instrument panel that is positionable into, and locked in, an unused position in which the panel is concealed to prevent tampering. It more particularly relates to bipartite instrument panel structure consisting of a supported, instrument-carrying rotor part and a supporting housing part surrounding same. The instrument-carrying part rotates on its axis from a used position in which the instruments register with an opening fixed in the housing part, into a concealed locked position within the housing in which it is on the opposite side of the housing blocked from the opening.

My invention has particular application to tractor, loader, grader, dozer, and other off the road vehicles having driver compartments which are unlocked and which, quite commonly, are entirely open compartments. The driver's instruments according to the existing practice are exposed to hail and other damage from the weather, being sometimes so exposed irrespective of whether the vehicle is in use or not. When not in use, the instruments of such vehicle are also exposed to and vulnerable to accidental or willful damage from animals, vandals, and the like. When in use, the instruments of some prior art panels are subject to damage because of jarring and machine vibrations transmitted through a practically uninterrupted metal path from the body into the instrument panel.

The present invention materially reduces or substantially prevents damage from the foregoing causes, as will now be explained. Certain features, objects, and advantages are specifically pointed out or will become apparent when, for a better understanding of the invention, reference is made to the following written description taken in conjunction with the accompanying drawings, which show a prefered embodiment thereof and in which:

FIGURES 1 and 2 are front elevational and top plan views of an instrument panel embodying the present invention;

FIGURE 3 is an end elevation seen from the right end as viewed in FIGURE 1;

FIGURES 4 and 5 are transverse sections taken in end elevation along the respective section lines IV—IV and V—V at the right end in FIGURE 1; and FIGURE 6 is a longitudinal section in top plan taken along the section lines VI—VI at the right end in FIGURE 1.

More particularly in the drawings, a bipartite instrument panel structure is shown having an instrument-carrying rotor part 10, and a stator part 12 which supports the rotor part for rocking movement about a common longitudinal axis 14 and which is supported by the hood panel 16 of a vehicle. The vehicle can be, but not necessarily is, of the type having an open driver's compartment terminating at the front end by a dash panel 18 (FIGURE 3) which is immediately beneath the instrument panel structure.

The stator part 12 includes an open-topped adapter base 20 which is between the hood 16 and an instrument panel housing 22, the housing and base 22, 20 mutually defining an elongated cavity for sheltering the rotor part 10. The cavity has a driver-facing, instrument panel opening which is defined at the sides by housing end walls 24, 26 and which is defined at the top by a flat overhanging roof 28 of the housing.

The rotor part 10 has an unsymmetrical shape in transverse cross section, having a planar, chordally extending instrument panel 30 forming one of the vertically disposed sides, and a general cylindrical shape 32 at the other vertically extending side which is on the opposite side of the axis 14 from the instrument panel 30. The rotor part 10 has two generally semi-circular bearing plates 34 and 36 forming transverse end plates to box-in the rotor. A reinforcement strip 38 approximately one inch wide is secured to the rotor adjacent the right end plate 36 so as to close the cross section and reinforce it in the plane of an apertured locking lug 40 which is carried by the rotor 10 at the right end as viewed in FIGURE 1. The respective bearing plates 34 and 36 are carried on rubber shock, trunnion mountings 42 and 44 to relieve the rotor part 10 from jarring and vibrations.

In FIGURE 6, the mounting 44 includes a trunnion bolt 46 at one end of the rotor part 10 which is connected to the bearing plate 36 at that end by means of an anti-vibration bushing 48, and which is connected to the housing wall 26 at that end by means of a metal disk 50 and a complementary anti-vibration bushing 52 which is next to the disk 50. The disk 50 and a complementary metal disk 54 clamp the bushings 48 and 52 together, whereas a spacer sleeve 56 about the trunnion bolt 46 prevents the bolt from over-tightening the rubber.

A semispherical rubber stop or bumper 58 and a spiral coil spring 60 control the rotor part 10 so that it assumes a downwardly rotated position. The rotor part 10 has a generally horizontally extending portion at one side which carries the bumper 58 midway between the ends thereof and which is open at the opposite side indicated at 60′.

The spring 60 encircles the trunnion bolt 46 and has a fixed end 62 hooked into the adjacent end wall 26 of the stator part 12. The spring 60 has the opposite end 64 hooked into the rotor bearing plate 36 and is coiled under tension so as to tend to unwind in the counterclockwise direction as viewed in FIGURE 3. The rotor part 10 is thus constantly biased so that the apertured locking lug 40 is urged to take the solid line position shown in FIGURE 3.

The operator can turn the rotor part 10 upwardly such that the apertured locking lug takes the upper position shown by the dotted lines 40a registering with a transverse aperture 66 in the housing end wall 26. The adjacent portion of the housing roof 28 has a narrow slot 68 in the edge thereof to accommodate the lug 40. Suitable locking means such as a padlock 70 is provided in the registering apertures for locking the rotor in a nonuse position.

The trunnion mounting 42 at the opposite end of the rotor 10 is similar to the mounting 44 just described, except that the biasing spring 60 is not essential at both ends and is preferably omitted from the trunnion mounting 42.

The flat, chordally extending instrument panel 30 of the rotor 10 as viewed by the driver carries a left instrument cluster 72 and a right instrument cluster 74, each being supplied by separate electrical branch connections 76a and 76b forming portions of a common electrical instrument cable 76. Centrally of the panel, in vertical alignment with the bumper 58 as viewed in FIGURE 1, there are provided a lamp switch knob 78 for controlling the vehicle lamps and a fuse mounting 80.

During use of the vehicle, the rotor 10 has its open side 60 substantially at the top, but at a sheltered location well beneath the housing roof 28 so as to be protected from precipitation. The clusters 72 and 74 of instruments are in a plane of inclination forming a slight console angle to the driver for ready viewability. The shock free mountings at opposite ends of the rotor 10 prevent vibrations from entering into the rotor and the rubber bumper 58 likewise prevents vibrations from entering into the rotor.

In order to lock the instruments, the driver moves the rotor part into the nonuse position indicated by the broken line outline 10a in FIGURE 3, in which position the locking lug takes the dotted line position 48 and the generally cylindrical shape is exposed in the broken line position 32a. The latter shape cooperates with the roof 28 at this time in completely blocking the clusters of instruments from accessibility, at which time the inwardly facing instruments are secured below and well inside of the edge of the roof 28 and are fully sheltered from precipitation. The nonuse position is assumed against the bias of the spring 60 which, when the structure is unlocked, partially unwinds and restores the rotor 10 to its operative position.

The rotor part 10 and surrounding stator part are considerably longitudinally elongated to provide a low, compact structure, and the arc of swing of the rotor part between its two extreme positions is at least approximately 120°. More specifically in one physically constructed embodiment of the invention, the indicated radius R of the cylindrical shape 32 was 1.95", affording a length to diameter ratio of the rotor of 4.86 to 1. The rotor part was swung 119° from its operative position to its locked nonuse position. The cable 76 was introduced through a hole in the hood 16 by means of a grommet 82 and executed a half loop within the rotor and stator parts so as readily to accommodate to the rotor movement without kinking or chafing.

As herein disclosed, the invention is shown embodied in an arrangement of instruments having a flat panel 30. It is evident that the panel in its transverse dimension can be made arcuate, for example, convexly cylindrical as viewed from the outside of the rotor part.

The expression "rubber" as used herein refers to any material selected from the group comprising natural and synthetic elastomers and combinations of the two.

What is claimed is:

1. Bipartite instrument structure for a vehicle, comprising:
   a supported rotor part for carrying the instruments and having, as viewed in end elevation, a generally cylindrical shape and a longitudinal axis; and
   a housing part supporting the supported part for rotation about its longitudinal axis aforesaid;
   said housing and supported parts, along a corresponding longitudinal side thereof, presenting respectively, as viewed in cross section, an instrument housing opening and a generally chordwise extending instrument panel which register in their operative relation.

2. Bipartite instrument structure for a vehicle, comprising:
   a supported rotor part for carrying the instruments and having, as viewed in end elevation, a generally cylindrical shape and a longitudinal axis;
   a housing part supporting the supported part for rotation about its longitudinal axis aforesaid;
   said housing and supported parts, along a corresponding longitudinal side thereof, presenting respectively, as viewed in cross section, a generally chordwise extending instrument housing opening directly under a top and a generally chordwise extending instrument panel which are registerably related and substantially parallel in an operative position; and
   means for rotating the supported part into a position such that the chordwise panel is within, on the opposite longitudinal side of, the housing blocked from the opening.

3. Bipartite instrument structure for a vehicle, comprising:
   a supported rotor part for carrying the instruments and having, as viewed in end elevation, a generally cylindrical shape and a longitudinal axis;
   a housing part supporting the supported part for rotation about its longitudinal axis aforesaid;
   said housing and supported parts, along a corresponding longitudinal side thereof, presenting respectively, as viewed in cross section, a generally chordwise extending instrument housing opening directly under a top and a generally chordwise extending instrument panel which register and are substantially parallel in their operative relation;
   means biasing the parts into the operative relation described; and
   means for rotating the supported part into a nonuse position such that the chordwise panel is within, and on the opposite longitudinal side of, the housing blocked from the opening.

4. Bipartite instrument structure for a vehicle, comprising:
   a supported part for carrying instruments and having a longitudinal axis, said part having an unsymmetrical cross-section comprising a generally chordally extending instrument panel and a generally cylindrical shape arranged in a mutually opposing disposition with the axis therebetween;
   a roofed housing part supporting the supported part for rotation on said longitudinal axis thereof;
   said supported and housing parts, along a corresponding longitudinal side thereof, presenting respectively as viewed in cross section the generally chordally extending instrument panel and a housing opening which have an operative position registerably related below the edge of a housing roof;
   means for rotating and locking the supported part in a nonuse position so that the cylindrical shape thereof blocks the opening at the side of the housing and the chordally extending instrument panel is on the opposite longitudinal side of, and within, the housing at a point completely beneath the roof; and
   means biasing the rotor part into the operative position.

5. The invention of claim 4, further comprising plural clusters of instruments carried by the generally chordally extending instrument panel of the supported part; and
   cable means extending in a generally lengthwise direction in the bipartite instrument structure, said cable means executing a half loop therein and being connected to the individual instrument clusters so as not to kink, chafe, or interfere with rotation of the supported part.

6. Bipartite instrument structure for a vehicle, comprising:
   a supported part for carrying instruments and having a longitudinal axis, said part having an unsymmetrical cross-section comprising a generally chordally extending instrument panel and a generally cylindrical shape arranged in a mutually opposing disposition with the axis therebetween;
   a housing part having means including two supported trunnions mounting the supported part for rotation on the aforesaid longitudinal axis thereof;
   said supported and housing parts, along a corresponding longitudinal side thereof, presenting respectively as viewed in cross section the generally chordally extending instrument panel and a housing opening below the edge of a housing roof, which are registerably related in an operative position;
   means resisting rotation of said supported part from the operative position aforesaid; and
   means for rotating and locking the supported part in a nonuse position so that the cylindrical shape thereof blocks the opening at the side of the housing and the chordally extending instrument panel is on the opposite longitudinal side of the housing at a point completely beneath the roof.

7. The invention of claim 6,
   said housing part having the mounting means at each end and each carrying one of the supported trunnions thereon at that end, the trunnion being set in rubber bushings in the mounting means so as to rotatably suspend the supported part on rubber in a two-point suspension.

8. The invention of claim 7, further comprising a rubber bumper carried on one part and engageable by the other so that movement of the supported part from its nonuse position is limited by engagement of the rubber bumper when the operating position is attained.

9. The invention of claim 6, said means for rotating and locking comprising an apertured lug carried on one of the parts and registerable with apertured means on the other of the parts when they are in their nonuse position; and padlock means receivable in the apertures for locking the parts in their nonuse position.

10. The invention of claim 9, said apertured lug being carried by the supported part and engaging the housing part so as to limit the swing of the supported part in its position of nonuse; and a rubber bumper carried by the supported part and engaging the housing part to limit rotation of the supported part when its operative position is attained, the total arc of swing being at least approximately 120°.

11. The invention of claim 6, said mounting trunnions being rigidly connected to the supporting part and having space at all points from the trunnions to the supported part; and bushings of elastomeric material interposed in said space to avoid a metal-to-metal mounting connection from the trunnions to the supported part.

12. The invention of claim 11, said rotation resisting means comprising a coil spring surrounding the bushing at one end of the structure and connected between a portion of the supported part at that end and a portion of the housing part at that end, said spring tending to unwind between its ends for biasing the supported part into the operative position.

13. A vehicle having:
plural clusters of driver's instruments;
a hood on the vehicle having a fore and aft extending, generally horizontal portion;
a supported rotor part carrying the instrument clusters thereon and having, as viewed in end elevation, a generally cylindrical shape defining a central axis;
a housing part supported on the horizontal hood portion and supporting the supported part for rotation about its central axis aforesaid;
said housing and supported parts, along a corresponding side thereof parallel to said axis, presenting respectively, as viewed in cross section, a generally chordwise extending instrument housing opening directly under a housing top, and a generally chordwise extending instrument panel having an operative relation in which they register and in which they are substantially parallel to one another and to said axis;
means biasing the parts into the operative relation aforesaid; and
means for rotating the supported part into a nonuse position such that the chordwise panel is on the opposite side of the axis in said housing blocked from the opening; and
an instrument cable extending through an opening in the horizontal hood portion, and in a generally parallel direction to said axis, within said parts, so as to execute a half loop therein and being connected to the individual instrument clusters.

References Cited by the Examiner

UNITED STATES PATENTS

| | | | |
|---|---|---|---|
| 2,202,277 | 5/1940 | Visser | 180—90 |
| 2,699,966 | 1/1955 | Moon | 317—120 |
| 2,876,857 | 3/1959 | Beyerstedt | 180—90 |
| 2,976,947 | 3/1961 | Cruthis et al. | 180—90 |
| 2,994,807 | 8/1961 | Devine et al. | 317—99 |
| 3,164,918 | 1/1965 | Brown | 240—8.16 X |

KENNETH H. BETTS, *Primary Examiner.*